(12) United States Patent
Luber et al.

(10) Patent No.: US 7,077,268 B2
(45) Date of Patent: Jul. 18, 2006

(54) PACKAGING FOR A REEL OF MAGNETIC TAPE

(75) Inventors: Klaus Luber, Sulzbach-Rosenberg (DE); Ralph Hopfensitz, Nürnberg (DE)

(73) Assignee: Leonard Kurz GmbH & Co. KG, Furth (DE)

( * ) Notice: Subject to any disclaimer, the term of this patent is extended or adjusted under 35 U.S.C. 154(b) by 0 days.

(21) Appl. No.: 10/489,018

(22) PCT Filed: Sep. 18, 2002

(86) PCT No.: PCT/DE02/03477

§ 371 (c)(1),
(2), (4) Date: Mar. 8, 2004

(87) PCT Pub. No.: WO03/033379

PCT Pub. Date: Apr. 24, 2003

(65) Prior Publication Data

US 2004/0245129 A1    Dec. 9, 2004

(30) Foreign Application Priority Data

Oct. 10, 2001 (DE) .................. 101 49 979

(51) Int. Cl.
*B65D 85/66* (2006.01)
(52) U.S. Cl. .................. 206/397; 206/408; 206/410
(58) Field of Classification Search ............. 206/359, 206/397, 408, 410, 308.1, 592, 594, 512, 206/493, 523
See application file for complete search history.

(56) References Cited

U.S. PATENT DOCUMENTS

| | | | | | |
|---|---|---|---|---|---|
| 1,898,857 | A | * | 2/1933 | Theiss | 206/410 |
| 1,925,565 | A | * | 9/1933 | Nelson | 206/408 |
| 2,776,772 | A | * | 1/1957 | Itoda | 217/26.5 |
| 3,396,835 | A | * | 8/1968 | Boutonnet | 206/410 |
| 3,685,646 | A | * | 8/1972 | Sy | 206/408 |
| 4,120,398 | A | | 10/1978 | Braddon, Sr. | |
| D250,396 | S | * | 11/1978 | Weil | D9/456 |
| 4,413,298 | A | * | 11/1983 | Pecsok et al. | 360/133 |
| 4,475,653 | A | * | 10/1984 | Ullman | 206/497 |
| D276,702 | S | * | 12/1984 | Entenmann et al. | D9/456 |
| 4,699,268 | A | * | 10/1987 | Oishi | 206/313 |
| 4,738,546 | A | * | 4/1988 | Sengewald | 383/7 |
| 4,944,398 | A | | 7/1990 | Gatt | |
| 6,296,118 | B1 | * | 10/2001 | Speck | 206/408 |

FOREIGN PATENT DOCUMENTS

| | | | |
|---|---|---|---|
| CH | 623 952 A5 | 6/1981 | |
| EP | 0 069 672 A1 | 1/1983 | |

* cited by examiner

*Primary Examiner*—Shian T. Luong
(74) *Attorney, Agent, or Firm*—Hoffmann & Baron, LLP

(57) ABSTRACT

Described is a packaging (10) for a magnetic tape reel (12) wound on to a core element (32), comprising a tray element (14) with a bottom (16) from which a central centering projection (20) for centeredly fixing the core element (32) of the magnetic tape reel (12) and stacking projections (22) which are radially equally far away from the centering projection (20) for stacking tray elements (14) one upon the other project upwardly in the same direction.

2 Claims, 1 Drawing Sheet

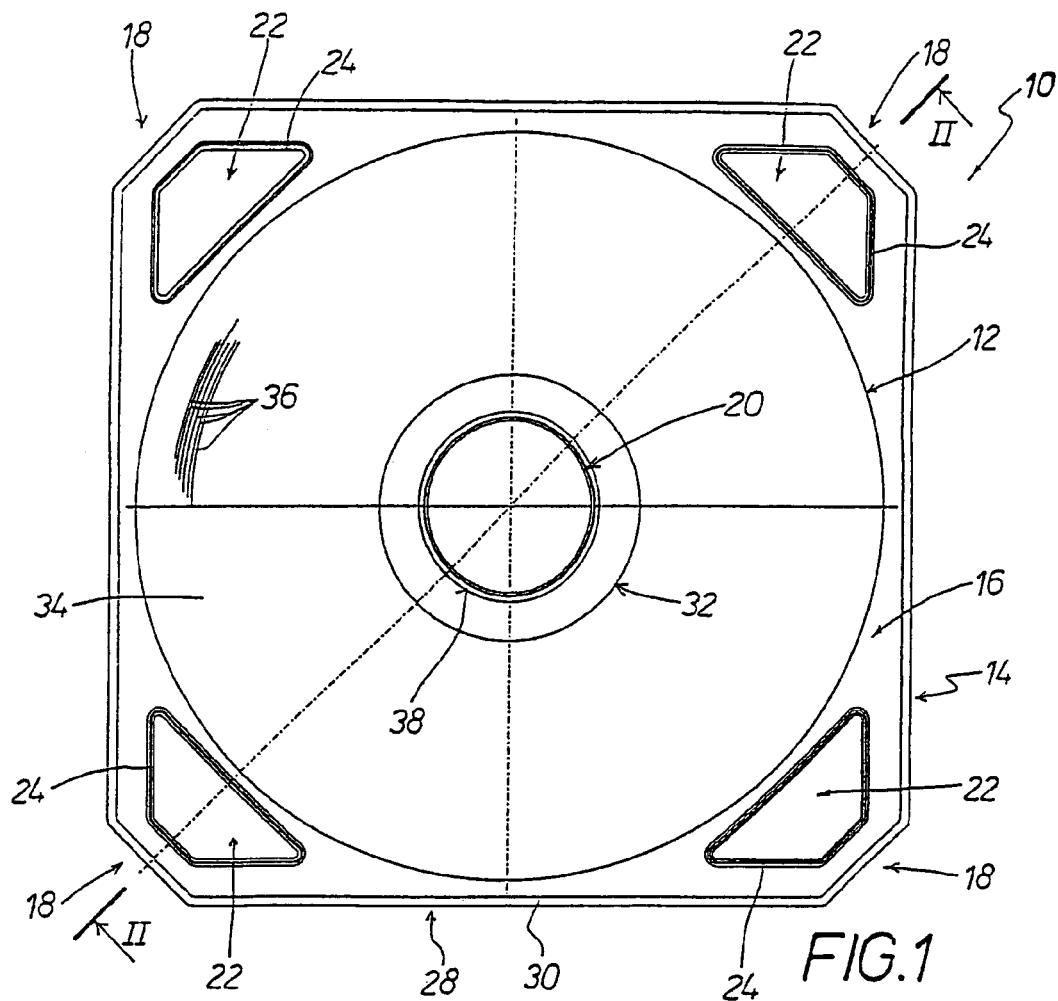
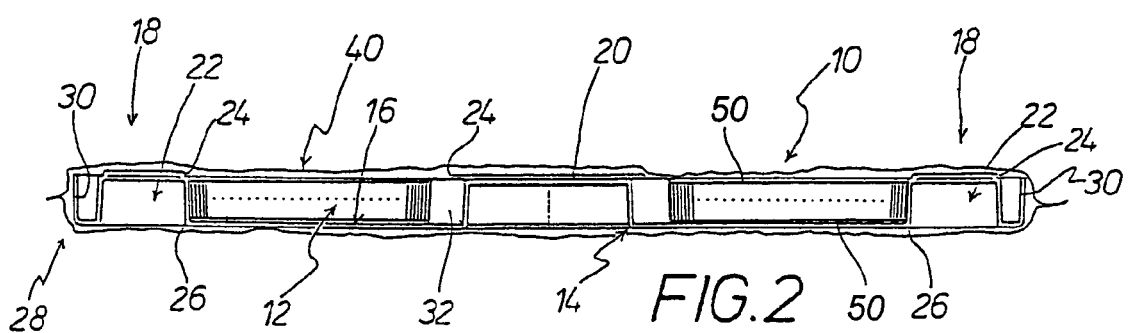

PACKAGING FOR A REEL OF MAGNETIC TAPE

This application claims priority based on an International Application filed under the Patent Cooperation Treaty, PCT/DE03/03477, filed on Sep. 18, 2002, and German Patent Application No. 101 49 979.5, filed on Oct. 10, 2001, both of which are incorporated herein by reference in their entirety.

BACKGROUND OF THE INVENTION

The invention concerns a packaging for a magnetic tape reel wound on to a core element, as set forth in the classifying portion of claim 1.

Hitherto magnetic tape reels are for example welded into a plastic film. Then however the plastic film is pierced again by the magnetic tape reel being fitted with its core element on to a cutting bar. The magnetic strip reel when prepared in that way, with the plastic film that has been opened again, is then put on to a core bar which is disposed in a packaging carton and which also comprises a carton material. Disposed between respectively adjacent magnetic tape reels which are fitted on to the core bar is an intermediate layer element which for example comprises a plastic foam material. In that known packaging therefore, as a result of the plastic film having been opened again, the magnetic tape reels are only very limitedly protected from dust, which has proven to be a disadvantage. Such a packaging of a carton material is also sensitive to moisture, which has proven to be a disadvantage, in particular when it is transported by sea. A further disadvantage of such a carton packaging lies in the comparatively low stability thereof. That can result in unwanted displacement or shifts of individual layers of the tape in a magnetic tape reel.

The magnetic tape of such a magnetic tape reel can be for example of a width of 6.35 mm or a width of 12.7 mm. It will be appreciated that other width dimensions are also possible. The outside diameter of a magnetic tape reel can be for example about 300 mm, which means that a magnetic tape reel can be of an overall length of the magnetic tape of 4,000 m and more.

A packaging of the kind set forth in the opening part of this specification is known from U.S. Pat. No. 3,685,646 A. In that known packaging the respective tray element is provided with a circular bottom adjoined at the top side by four corner lugs so that overall this gives a tray element of square configuration in plan. In that known tray element the stacking projections are in the form of recesses, in the proximity of the central centering projection. The stacking projections bear against the core element of the magnetic tape reel to be packaged, which is disposed beneath the respective tray element. That arrangement gives rise to a pressing force between the tray elements and the magnetic tape reels arranged therebetween, in the packaged condition, and that pressing force in the extreme case can give rise to damage.

A packaging of the kind set forth in the opening part of this specification is also known from U.S. Pat. No. 4,120,398 A. In that known packaging, the respective tray element has stacking projections provided in the corner regions of the square bottom of the tray element, in the form of depressions. The bottom of the respective tray element has raised portions, on which the associated magnetic tape reel rests. This known packaging also provides that the magnetic tape reels are fixed between associated tray elements directly and immediately in positively locking relationship, and that can result in damage.

CH 623 952 A5 discloses a stackable pallet comprising plastic material, which serves for archiving magnetic tapes wound on various kinds of flange-less winding cores. The pallet has a boss which is raised into the axial center, with a central bore. The pallet is suitable in particular for the despatch of magnetic tapes of relatively large diameter, which are wound on to flangeless cores, and is so shaped that it can accommodate various kinds of winding cores. A pair of such pallets is enclosed with a heat-shrinkable film for the purposes of covering the outer tape winding of a number of magnetic tapes which are wound on to stackable cores and which are arranged in a row directly one above the other. Here the magnetic tape reels therefore bear against each other stacked directly and immediately one upon the other. If a magnetic tape reel is required, then the entire stack has to be opened.

SUMMARY OF THE INVENTION

The object of the present invention is to provide a packaging of the kind set forth in the opening part of this specification, in which displacements of individual magnetic tape layers of the magnetic tape reel is avoided, complete dust protection for the magnetic tape reel is afforded, and transport damage is reliably prevented.

In accordance with the invention, in a packaging of the kind set forth in the opening part of this specification, that object is attained by the features of claim 1.

A number of tray elements with magnetic tape reels, which are respectively welded into a plastic film, can be arranged in a transport packaging enclosure.

The tray element is simple and inexpensive to produce. It is only of a small wall thickness so that its own weight is minimal. The tray element is of such mechanical strength and stability in respect of shape, that transport damage to the associated magnetic tape reel is reliably avoided. The central centering projection, which stands up from the bottom, for the core element of the magnetic tape reel, is of an axial dimension, that is to say height, which is adapted to the axial dimension of the core element, wherein the magnetic tape reel is of a width dimension corresponding to the core element or is only very slightly smaller than same.

Tray elements which are stacked one upon the other and which are each provided with a respective magnetic tape reel rest upon each other with their stacking projections, wherein magnetic tape reels which are stacked in mutually superposed relationship are definedly spaced from each other, that is to say separated from each other. The tray elements which are stable in respect of shape reliably exclude displacement of individual layers of the magnetic tape of the magnetic tape reels.

The fact that, in accordance with the invention, a peripherally extending wall stands upwardly from the outer edge of the bottom affords good protection for the respective magnetic tape reel. The peripherally extending wall is so dimensioned that the stacking projections project definedly above the peripherally extending wall so that, when tray elements are stacked one upon the other, the walls of the tray elements which are stacked one above the other are in contact with each other. That provides protection for the stacked magnetic tape reels, from influences from the exterior.

The intermediate layer element provided between the bottom of the tray element and the magnetic tape reel serves for protection and for optimum support for the respective magnetic tape reel. Desirably that intermediate layer element comprises a suitable plastic foam material. This can involve a PU foam. The intermediate layer element has a hole corresponding to the central centering projection of the tray element.

The same purpose, that is to say further improved protection for the respective magnetic tape reel, is also served by the second intermediate layer element which is disposed on the magnetic tape reel arranged in the tray element. That second intermediate layer element is preferably of the same configuration as the above-mentioned first intermediate layer element at the bottom side, in order suitably to simplify stockkeeping.

In accordance with the invention the tray element equipped with the magnetic tape reel and the intermediate layer elements is welded in sealed relationship into a plastic film, thereby providing reliable dust protection for the magnetic tape reel. Reliable dust protection of that nature is an aspect of very great importance in relation to magnetic tape reels in order to satisfy the functional properties of the magnetic tape, that is to say not to unintentionally impair them. The plastic film used is for example a PE film.

A number of magnetic tape reels welded into a plastic film, that is to say a number of packagings according to the invention with magnetic tape reels, are desirably arranged in an external transport packaging enclosure. That transport packaging enclosure is for example an external packaging comprising a cardboard material. A corresponding number of cardboard external packagings can then also be arranged in a container packaging which can be for example of a volume of the order of magnitude of 1 m$^3$.

BRIEF DESCRIPTION OF THE DRAWINGS

Further details, features and advantages will be apparent from the description hereinafter of an embodiment of the packaging according to the invention, illustrated in the drawing in which:

FIG. 1 is a view of the packaging from above, showing the tray element and the magnetic tape reel positioned therein, and FIG. 2 is a view in section taken along section line II—II in FIG. 1 through the tray element, wherein the magnetic tape reel is not shown but the plastic film completely enclosing the tray element with the magnetic tape reel (not shown) is clearly indicated.

DESCRIPTION OF THE PREFERRED EMBODIMENTS

FIG. 1 shows a packaging 10 for a magnetic tape reel 12. The packaging 10 has a tray element 14 with a bottom 16. The bottom 16 is of a square configuration in plan, with bevelled corners 18.

As can be seen also from FIG. 2, a central centering projection 20 and stacking projections 22 which are radially equally far away from the centering projection 20 project upwardly from the bottom 16 in the same direction.

In the embodiment shown in FIG. 1 the stacking projections 22 are of a trapezoidal peripheral edge contour. It will be appreciated that the stacking projections 22 can also be of a different edge contour.

At its top end each stacking projection 22 has a peripherally extending positioning surface 24 and a support surface 26 which corresponds thereto and which extends around the projection at the lower end thereof. In the mutually superposed stacked condition of adjacent packagings 10 the support surfaces 26 at the underside bear in accurately fitting relationship against the positioning surfaces 24 at the top side, so that adjacent packagings 10 or tray elements 14 of the packagings 10 are secured to prevent lateral displacement thereof.

A peripherally extending wall 30 projects upwardly from the outer edge 28 of the bottom 16 of the tray element 14. The wall 30 is of a heightwise dimension which corresponds to the heightwise dimension of the stacking projections 22 between the support surface 26 and the positioning surface 24 so that the walls 30 of tray elements 14 which are stacked one upon the other bear against each other. The stacking projections 22 project slightly above the peripherally extending wall 30, as FIG. 2 clearly shows.

The magnetic tape reel 12 comprises a magnetic tape which is wound on to an annular core element 32 and which is only indicated by some short mutually spaced lines 36 (see FIG. 1). The core element 32 has a central hole 38, the diameter of which is adapted to the diameter of the central centering projection 20 of the tray element 14 so that the magnetic tape reel 12 is supported without play in the tray element 14 at the central centering projection 20.

Before the magnetic tape reel 12 is arranged in the tray element 14, an intermediate layer element or separator 50 of a plastic foam material is arranged in the tray element 14. After that intermediate layer element 50 is placed on the bottom 16, the magnetic tape reel 12 is arranged in the tray element 14. Then, a second intermediate layer element or separator 50 is arranged on the magnetic tape reel 12 which is positioned in the tray element 14. Thereafter, the tray element 14 with the magnetic tape reel 12 and the intermediate layer elements 50 is sealingly welded into a plastic film 40 (see FIG. 2). The packagings 10 produced in that way are stacked in closely superposed relationship. A stack comprising a number of such magnetic tape packagings 10 is then arranged in an external transport packaging enclosure of a cardboard material and prepared for despatch. A number of such transport packaging enclosures can then be arranged for example in a transport container and transported therein.

The invention claimed is:

1. A packaging for a magnetic tape reel wound on to a core element, comprising a tray element with a bottom from which projects a central centering projection for centeredly fixing the core element of the magnetic tape reel, wherein the bottom comprises an outer edge, wherein stacking projections which are radially equally far away from the centering projection are provided for stacking tray elements one upon the other, the bottom of the tray element is square and the stacking projections project in the corner regions away from the square bottom of the tray element in the same direction, wherein the stacking projections project upwardly in the same direction as the centering projection, a continuous wall projects upwardly from the outer edge of the bottom in peripherally extending relationship, an intermediate layer element is arranged between the bottom and the magnetic tape reel, a second intermediate layer element is arranged on the magnetic tape reel disposed in the tray element, and the tray element provided with the magnetic tape reel and the intermediate layer elements are packaged within a welded plastic film.

2. A packaging according to claim 1, wherein each of a number of tray elements with magnetic tape reels is within a welded plastic film, and wherein the number of tray elements within the welded plastic films are arranged in a transport packaging enclosure.

* * * * *